United States Patent
Sarkis

[11] 4,296,472
[45] Oct. 20, 1981

[54] NON-INTRUSIVE FLUID MEASURING SYSTEM

[75] Inventor: Barkhoudarian Sarkis, Madison Heights, Mich.

[73] Assignee: Rockwell International Corporation, Pittsburgh, Pa.

[21] Appl. No.: 80,556

[22] Filed: Oct. 1, 1979

[51] Int. Cl.³ .............................................. G01F 23/26
[52] U.S. Cl. .................................... 364/509; 364/442; 73/304 C
[58] Field of Search .................. 364/509, 510, 442; 73/304 R, 304 C, 114

[56] References Cited

U.S. PATENT DOCUMENTS

| | | | |
|---|---|---|---|
| 2,304,822 | 12/1942 | Harrison et al. | 235/61 |
| 2,354,964 | 8/1944 | Ostermann et al. | 73/304 |
| 2,656,977 | 10/1953 | Cummings | 235/61 |
| 2,767,360 | 10/1956 | Storm | 318/28 |
| 3,118,302 | 1/1964 | Fathauer | 73/114 |
| 3,332,283 | 7/1967 | Michalowicz | 73/219 |
| 3,423,998 | 1/1969 | Blomgren, Jr. | 73/113 |
| 3,549,868 | 12/1970 | Watson et al. | 364/442 X |
| 3,635,079 | 1/1972 | Tomlinson | 73/114 |
| 3,695,097 | 10/1972 | Michalowicz | 73/113 |
| 3,714,823 | 2/1973 | Wilkens et al. | 73/113 |
| 3,846,760 | 11/1974 | Ironside | 364/442 X |
| 3,908,451 | 9/1975 | Walker et al. | 73/114 |
| 3,918,306 | 11/1975 | Maltby | 73/304 |
| 3,921,444 | 11/1975 | Taira | 73/114 |
| 3,926,045 | 12/1975 | Miller | 364/442 X |
| 3,927,305 | 12/1975 | Gruhl | 73/114 X |
| 3,937,083 | 2/1976 | Sabatino | 73/224 |
| 3,949,207 | 4/1976 | Savary et al. | 364/510 |
| 3,975,952 | 8/1976 | Lacher, Jr. et al. | 73/114 X |
| 3,983,372 | 9/1976 | Klaver | 73/114 X |
| 3,998,094 | 12/1976 | Martin | 73/114 |
| 4,002,062 | 1/1977 | Kuno et al. | 73/114 |
| 4,007,634 | 2/1977 | Alban | 73/114 |
| 4,012,949 | 3/1977 | Lanz | 73/114 |
| 4,020,683 | 5/1977 | Young | 73/114 |
| 4,026,251 | 5/1977 | Schweitzer et al. | 364/442 X |
| 4,030,351 | 6/1977 | Smith | 364/510 X |
| 4,031,363 | 6/1977 | Freeman | 73/114 X |
| 4,043,198 | 8/1977 | Stillwell, et al. | 73/242 |
| 4,050,295 | 9/1977 | Harvey | 73/114 |
| 4,061,023 | 12/1977 | Kuno et al. | 73/114 |
| 4,073,186 | 2/1978 | Erwin, Jr. | 73/114 |
| 4,083,248 | 4/1978 | Maier | 73/304 C |
| 4,090,408 | 5/1978 | Hedrick | 364/509 X |
| 4,092,851 | 6/1978 | Adres | 73/114 |
| 4,112,492 | 9/1978 | Summers | 364/509 |
| 4,134,301 | 1/1979 | Erwin, Jr. | 73/453 |
| 4,136,563 | 1/1979 | Mueller et al. | 73/194 E |
| 4,193,300 | 3/1980 | Peter | 364/510 X |

FOREIGN PATENT DOCUMENTS 1,373,345  11/1974  United Kingdom.
1,436,337  5/1976  United Kingdom.

*Primary Examiner*—Edward J. Wise

[57] ABSTRACT

A non-intrusive fuel measuring system particularly adapted for use in fuel tanks of diesel engines. The fuel measuring device may be utilized for measuring fuel level, fuel consumed, fuel flow rate, mass flow rate and other parameters. The fuel device comprises a capacitive probe, digital interface circuit means and data processing means. The capacitive probe is mounted within a conventional fuel gauge port of the fuel tank and does not interfere with normal flows of the recirculating diesel fuel.

34 Claims, 6 Drawing Figures

NON-INTRUSIVE FLUID MEASURING SYSTEM

BACKGROUND OF THE INVENTION

1. Field of the Invention

The invention is in the field of flow rate and fluid measurement systems and is particularly directed to fuel measurement systems utilizing capacitive probes.

2. Description of the Prior Art

Present vehicle fuel measurement techniques are relatively inaccurate and are commonly expressed in terms of fractions of tank capacity thereby providing only a gross fuel estimate. Fuel flow rates are generally determined by relatively expensive positive displacement mechanisms such as mechanical pistons or rotary impellers. Positive displacement devices, as represented, for example, by U.S. Pat. Nos. 4,043,198 and 2,304,822 depend upon float mechanisms and/or valve switch mechanisms. Some types of flow rate measurement systems utilize a reservoir or a "subtracting tank" in conjunction with positive displacement mechanisms as described, for example, in U.S. Pat. Nos. 3,332,283, 3,695,097, 3,714,823 3,937,083 and 4,020,683. These types of flow devices are not capable of measuring remaining or added fuel per se or change in fuel tank levels. Furthermore, the accuracy and ruggedness of these mechanisms are affected by dynamic forces which include vibration, shock, vehicle acceleration, fluid dynamics, etc.

It has been known to utilize capacitive probes for various fuel measurements as illustrated by U.S. Pat. Nos. 2,354,964, 2,656,977, 2,767,360, 2,772,049, 4,090,408 and 3,918,306. Such systems are generally not flexible enough to be utilized to measure both flow rate and consumed or remaining fluid, and these systems largely depend upon complex and expensive analog apparatus which gives only course measurements. Digital processing techniques have been known for utilization with various types of sensors such as velocity sensors and fuel sensors. Among teachings of this sort are U.S. Pat. Nos. 3,908,451, 3,921,444, 3,927,305, 3,983,372, 3,975,952, 4,061,023, 4,112,492 and 4,136,563.

U.S. Pat. Nos. 4,134,301 and 4,073,186 disclose microprocessors utilized in non-capacitive type flow meter systems, and U.S. Pat. No. 4,083,248 shows a capacitive probe and a read only memory for providing a table lookup feature for compensating for probe non-linearities.

The above patents utilizing the subtractive tank technique as well as U.S. Pat. No. 3,423,998 are particularly directed to measurements of recirculating fuels as found for example in diesel engines. In such engine systems, a large percentage of the intake fuel is not burned by the engine but is rather returned to the fuel tank. Fuel measurements are made difficult since the returned fuel is generally hot, foamy and unstable (a condition sometimes referred to as slug flow).

SUMMARY OF THE INVENTION

It is an object of the invention to overcome the disadvantages of the prior art by providing a simple, inexpensive non-intrusive and versatile fluid measurement system for measuring fluid quantity and fluid flow rates.

Another object of the invention is to provide a fuel measurement apparatus which overcomes the difficulty of reading the difference in two flow rates arising in diesel engines where a significant amount of engine intake fuel is returned to the fuel tank.

Another object of the invention is to provide a non-intrusive fuel measurement probe specifically adapted for incorporation into existing fuel tanks of diesel engine vehicles without the necessity for any special modifications to fuel tank structure.

Another object of the invention is to provide a fuel flow rate and fuel quantity measurement apparatus which requires no special temperature compensation means but utilizes instead a property of the fuel which has a temperature coefficient approximately equal but opposite to the temperature coefficient of volumn expansion. Specifically, by utilizing a capacitive probe having a capacitive valve dependent upon the permittivity of the fuel, accurate flow rate and fuel quantity measurements may be made without temperature compensating hardware.

Yet another object of the invention is to provide a non-intrusive capacitive probe in combination with digital interface circuitry and a microprocessor for permitting a low cost versatile diesel fuel level and flow rate measurement and recording system. Means are provided for displaying to the vehicle operator fluid level and flow rate data as well as for recording same for subsequent readout and remote processing.

Yet another object of the invention is to provide a capacitive probe in combination with digital interface circuitry and data processing means for storing a history of fuel level and fuel rate data signals which may be utilized to determine the consumed fuel or remaining fuel.

The invention may be characterized as a non-intrusive fuel measuring device for use with a fuel tank of a vehicle comprising a capacitive probe, digital interface circuit means, data processing means and means for outputting data signals. The capacitive probe includes first and second concentrically mounted electrodes, means for securing the first and second electrodes in spaced-apart relationship and means for securing the probe to the tank and for positioning the first and second electrodes in the interior of the tank for immersion in the fuel. The digital interface circuit means is secured and electrically connected to the probe for generating digital signals representative of the capacitive value between the first and second electrodes. The data processing means is positioned remote from the tank and near an operator compartment of the vehicle for receiving digital signals. The data processing means includes program memory storage means, data memory storage means, computing means connected to the program memory storage means and data memory storage means for calculating from the data signals the amount of fuel in the tank. The data memory storage means stores the data signals corresponding to the amount of fuel. The outputting means provides data signals so that the amount of fuel may be indicated. By making fluid level measurements over relatively short periods of time the data processing means may calculate fluid flow rates on a nearly instantaneous basis. Data signals corresponding to fluid flow rates as well as fluid levels may be stored for readout by data collection means and subsequent processing in remote central processing apparatus.

Thus, the electronic fuel meter system in accordance with the invention has a particular advantage in achieving rate measurements of fuel being consumed. The cycle time for measurements may be taken on the order of 1–2 seconds (nominally 1.2 seconds). Stored data signals indicative of the fuel level enable ready access of a plurality of readings for the fluid level spaced at relatively short time intervals from one another. This permits a simple program for calculation of the average value of a group of previous readings for display to the operator or for further storage for subsequent transfer to data collection devices. It is possible to perform the level measurements at very rapid intervals of time on the order of a 10 ms time window. This permits nearly instantaneous flow rate measurements utilizing the combination of microprocessor, digital interface and capacitive probe. Moreover, the described fuel meter system is completely non-intrusive and does not interfere with normal flow paths or flow rates which are desired to be measured. The fuel meter system thus has a distinct advantage over numerous other systems which require actual diversion of normal flow channels in order to measure flow rates.

For purposes of understanding the invention, fuel may be defined as any petroleum product such as diesel fuel, gasoline, kerosine, heating oil, engine oil, synthetic oils and the like. These substances generally have a dielectric constant in the range of 2-3. In order to differentiate the fluid being measured from air, the probe and apparatus of the invention may be utilized generally for substances where the dielectric constant is greater than unity.

BRIEF DESCRIPTION OF THE FIGURES

These and other objects of the invention will become clear in reference to the following description taken in conjunction with the drawings wherein.

DETAILED DESCRIPTION OF THE PREFERRED EMBODIMENT

Figure 1:
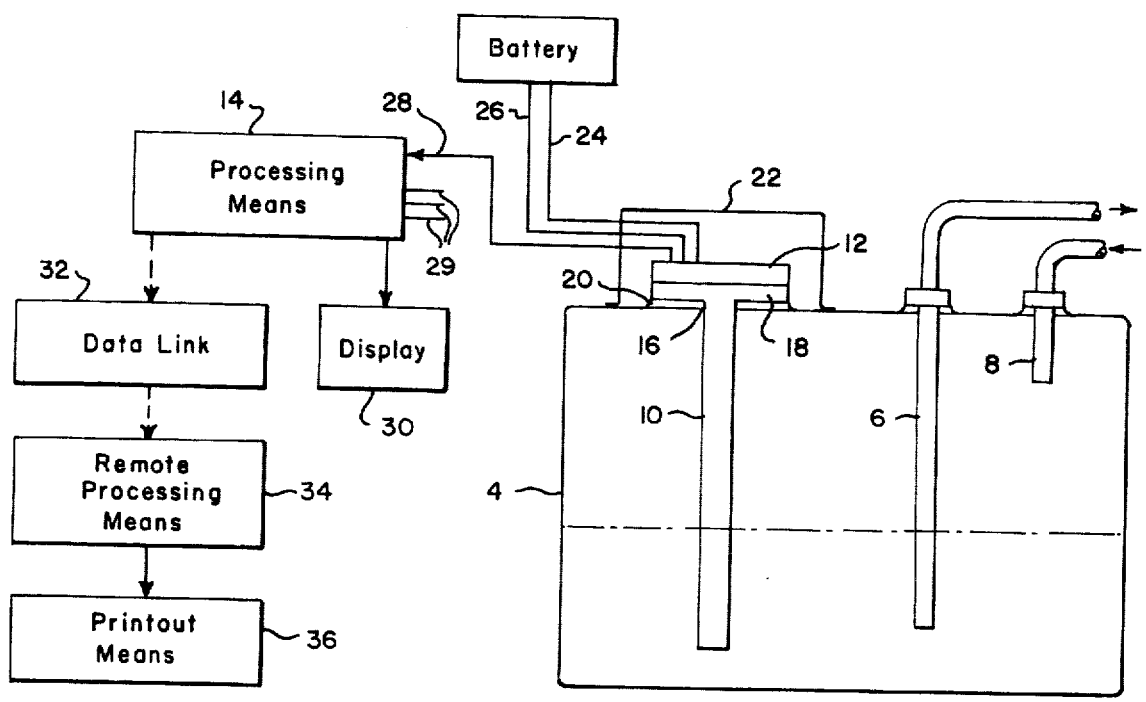
FIG. 1 is an overall block diagram of the electronic fuel meter system.

FIG. 1 illustrates an overall block diagram of an electronic fuel meter system 2. The fuel meter system 2 is shown utilized for measurement of diesel fuel in a diesel fuel system having a tank 4 for containing the diesel fuel, a fuel engine intake line 6 and a fuel tank return line 8. The electronic fuel meter system 2 comprises a capacitive probe 10, a digital interface 12 and a processing means 14. The probe 10 is positioned within a conventional fuel gauge port 16 of the tank 4 and is secured thereto by means of a flange 18 which matches and connects to the existing flange 20 of the fuel gauge port 16. A housing 22 is utilized to cover the interface 12. Powwer is supplied to the interface 12 by means of lines 24 and 26 generally connected to the vehicle battery. Optionally, a small battery may be incorporated within the interface 12. The output of the probe 10 and interface 12 is fed via a line 28 to the processing means 14. Processing means 14 may comprise, for example, a computing means and data storage means for storing signals from the probe 10 and interface 12 representative of the capacitance of the probe 10 which corresponds to the fluid level within tank 4. The output of the processing means 14 may be displayed to the operator by means of display 30. Processing means 14 may additionally be connected to a data link 32 which reads the data signals stored in memory of the processing means 14 for storage on internal memory of the data link 32. The internal storage means may comprise, for example, magnetic tape. The data link is portable and provides a mechanism to extract data from storage means of numerous fuel meter systems so that all such data may be processed by a large central computer system. Consequently, the data link 32 is shown connected by means of a dotted line to a remote processing means 34. Remote processing means 34 is connected to printout means 36 for providing a hard copy output of processed data. The utilization of the data link and remote processing apparatus is similar to that described in the copending application of Hansel O. Williams and John E. Juhasz entitled "Vehicle Monitoring and Recording System", filed Mar. 14, 1979, Ser. No. 20,622, incorporated herein by reference.

As shown in FIG. 1, the length of the capacitive probe 10 is such as to extend to a point slightly lower than the end of the fuel engine intake line 6. It is generally not desirable to extend the length of the probe 10 to the very bottom of the tank inasmuch as such fuel is not generally available through the fuel engine intake line 6 and thus, in a practical sense, the tank is empty once the level of the fuel is below the extreme end of the intake line 6.

The processing means 14 may poll a plurality of input ports to receive other data as, for example, signals from speed and RPM transducers and the like, as described in the aforementioned copending application. Thus, the processing means 14 may be utilized to calculate other vehicle parameters such as miles per gallon, gallons/engine revolution, gallons/cylinder firing, etc. Further, additional probes 10 and interface circuit 12 may be utilized for measurement of other fluid levels on the vehicle such as water, oil, brake fluid, etc. Such additional inputs are indicated at 29 in FIG. 1.

It has been found desirable to position the interface 12 relatively close to the probe 10 to reduce stray capacitive pickup. In the preferred embodiment, the probe 10 and interface 12 are each secured to the flange 18 which serves both as the means to mount said probe 10 to the tank 4 and as the means for securing the interface 12 closely adjacent the probe 10.

Figure 2:
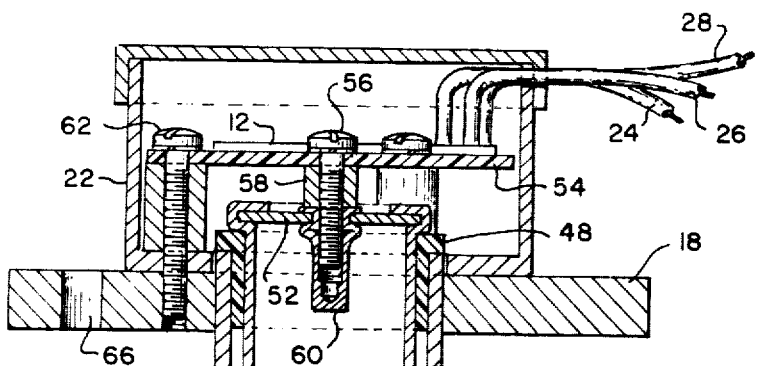
FIG. 2 is a cross-sectional view of the capacitive probe and interface mounting means.

FIG. 2 shows a detailed cross-sectional view of the probe 10 and an interface support means for interface 12. Probe 10 is seen to comprise an outer cylindrical electrode 40 and an inner cylindrical electrode 42. The outer and inner electrodes are concentrically positioned and are open at bottom ends 44 and 46 respectively. Flange 18 is utilized to secure the entire assembly to the fuel gauge port flange 20 as shown in FIG. 1. Flange 18 also is utilized to secure the outer and inner cylinders within the flange central opening. Insulation means 48 in the form of a cylindrical spacer is utilized for securing the inner and outer cylinders in a spaced apart relationship. The lower ends of the cylindrical electrodes 40 and 42 are secured in spaced apart relationship by means of insulating rivets 50. Typically, three such rivets may be provided and spaced 120° apart.

The probe is also provided with an upper end support 52 which closes off the inner cylindrical electrode 42 of the probe 10 and serves as a support for securing the circuit interface 12. The circuit interface 12 is secured on a printed circuit board (PCB) 54 which is rigidly secured to the inner cylindrical electrode via a screw 56, spacer 58, rivet nut 60 and upper end support 52. Electrical contact to the inner cylindrical electrode 42 is also made via the upper end support 52, rivet nut 60 and screw 56 (and/or spacer 58). The printed circuit board 54 is also secured to the flange 18 via screws 62 and associated spacers 64. Typically, three such screws and spacers may be positioned 120° apart around the periphery of the PCB 54. The discrete circuit components of the interface 12 are secured to the PCB 54 and are not shown for simplicity of illustration. A detailed circuit diagram of the interface 12 is set forth in FIG. 4.

Housing 22 forms an enclosure for the interface 12 and protects same from damage, dirt etc.

Flange 18 is provided with a plurality of holes 66 which match conventional fuel port flange 20 in order to secure the entire probe assembly to the tank 4.

In practice, it is desirable to utilize a probe 10 having a length extending slightly below the lower end of the fuel engine intake line 6. In manufacturing the probe 10 it is possible to merely cut off the outer and inner cylindrical electrodes 40 and 42 respectively, and subsequently, drill holes near the end 44 of the inner electrode 42 so that the insulating rivets 50 may be positioned therein. Alternately, standard groups of rivet holes for the inner electrode 42 may be drilled along the length of the electrode 42 prior to cutting.

In the preferred embodiment of the invention the probe 10 comprising the outer and inner cylindrical electrodes 40 and 42 respectively are anodized to remove any tendency of shorting due to conduction within the diesel fuel. Although electrodes may be utilized in other arrangements as that shown, it is preferable to have concentrically positioned electrodes in order to provide structural rigidity.

Figure 3A:
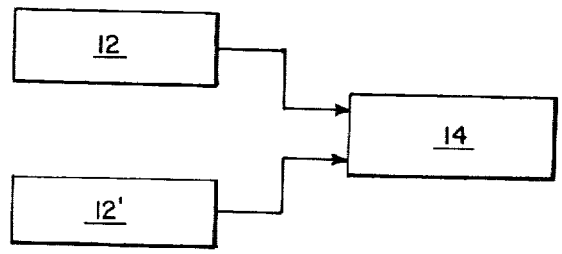
FIG. 3A is a block diagram illustrating the incorporation of a second digital interface for use with the reference probe of FIG. 3.
Figure 3:
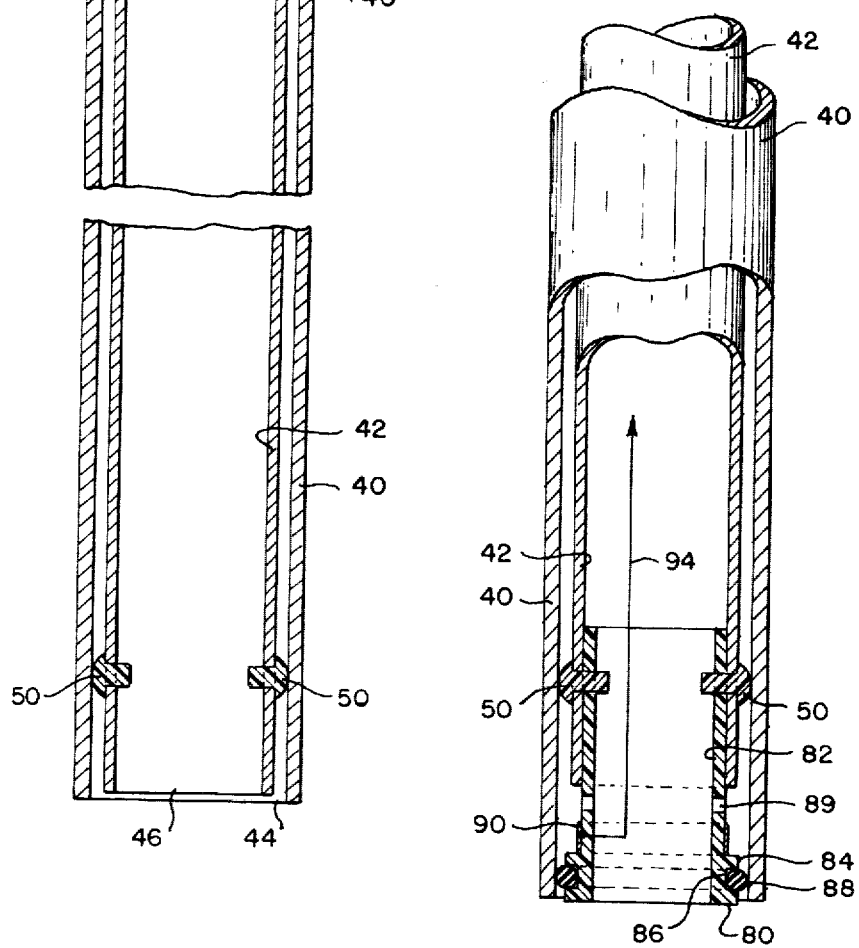
FIG. 3 is a cross-sectional view of a second embodiment of the probe of FIG. 1 wherein a reference probe is incorporated into the lower end thereof.

In accordance with another aspect of the invention a reference probe may be fabricated on an end securing means for the main capacitive probe 10. FIG. 3 is a cross-sectional view of an end securing means 80 utilized as a reference probe. End securing means 80 is fabricated from an insulating material such as acetal or nylon and comprises a cylinder 82 through which three apertures are drilled for receiving insulating rivets 50. The outer diameter of the cylinder 82 is somewhat smaller than the inner diameter of inner cylindrical electrode 42. End securing means 80 further comprises a shoulder 84 having a groove 86 for securing an O-ring 88. O-ring 88 is compressed between the inner wall of the outer cylindrical electrode 40 and shoulder 84 as shown in FIG. 3. The end securing means 80 thus is utilized to secure the bottom ends of outer and inner cylindrical electrodes 40 and 42 respectively in coaxial spaced relationship with respect to one another. Apertures 89 are provided to ensure fluid communication between the inner and outer electrodes.

A cylindrical area of the cylinder 84 is electroplated at 90 to form a reference electrode. The outer cylindrical electrode 40 is utilized as the ground electrode. A reference capacitor may thus be fabricated by electroplating the area of the cylinder 82 which is separate from and not in electrical contact with the inner cylindrical electrode 42. The grounded outer cylindrical electrode 40 may thus serve as an electrode for both the inner cylindrical electrode 42 and the reference electrode 90.

Positioning of the reference electrode 90 at a level below the bottom end 46 of the inner cylindrical electrode ensures that the reference electrode 90 will always be submersed in fuel. A wire 94 is provided to electrically connect the reference electrode to an interface 12' similar to interface 12. Processing means 14 receives signals from both interface 12 and 12' as illustrated in FIG. 3A.

A particular advantage in utilizing the embodiment shown in FIG. 3 is that the end securing means 80 may be dimensionally made the same for all lengths of the probe 10. It is thus merely necessary to cut off the outer and inner cylindrical electrodes to desired lengths. The end securing means 80 will then fit onto the end of all such probes 10 to secure the two electrodes in spaced apart relationship and provide the desired reference probe.

The utilization of the reference capacitor probe as illustrated in FIG. 3 has a particular advantage of permitting determination of the type of fluid contained within the tank. Inasmuch as the reference electrode is normally always submersed in the fluid, the effective area as well as gap length are constant and the only variation of the capacitance is caused by the permittivity of the material between the reference electrodes. However, the permittivity is directly indicative of the type of material being utilized. Thus, it is possible to determine whether gasohol, water or other substances are being pumped into the tank by merely storing the period of the resulting time signals expected for the desired fuel, as well as common foreign substances which may be pumped into the fuel tank. An indication of an undesirable substance may be displayed to the operator of the vehicle by utilizing the display 30 of FIG. 1, or by using table look-up techniques, the identity of the fluid in the tank may be indicated.

Figure 4:
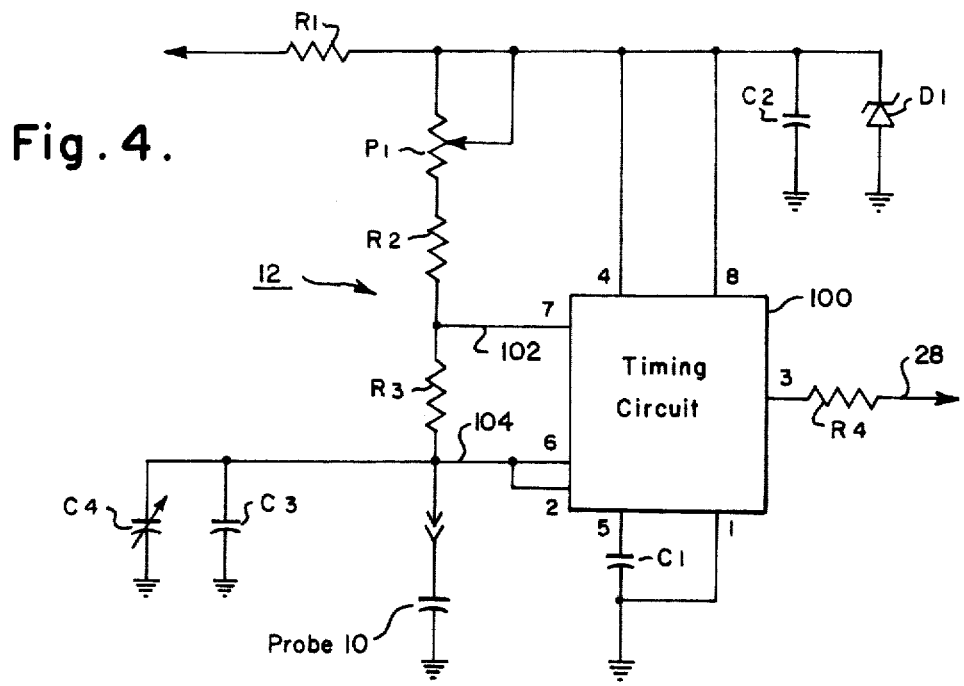
FIG. 4 is a schematic diagram of the digital interface circuit in accordance with the teachings of the invention.

FIG. 4 illustrates a schematic diagram of the interface 12 in accordance with the invention. Interface 12 is seen to comprise a timing circuit 100, resistors R1, R2, R3 and R4, potentiometer P1, capacitors C1, C2, C3 and C4 and diode D1. Timing circuit 100 provides output signals along output line 28 and responds to the voltage level along input lines 102 and 104. The timing circuit 100 may be, for example, the model MC1555 operable as an astable multivibrator. (Pin numbers for the Model MC1555 circuit are shown identical to that given in the manufacturer's data sheet.) The astable multivibrator resulting from the circuit configuration shown is charged through the resistor chain R1, P1, R2 and R3 and discharged through the resistor chain R1, P1 and R2. The capacitor probe 10 forms part of the RC charging and discharging circuit such that a square wave output provided at pin 3 along line 28 has a period proportional to the capacitance of probe 10. Potentiometer P1 and variable resistor C4 enable adjustment of the zero crossing and full scale reading of the capacitive probe. By the zero crossing it is meant that the capacitive probe 10 has a measurable capacitance even when no fuel is inbetween the outer cylindrical electrode 40 and inner cylindrical electrode 42. Adjustment of capacitor C4 enables adjustment of the value of this zero index for no fuel. Adjustment of the charging time constant through the potentiometer P1 enables variation of the timing period so that a desired dynamic range of the probe assembly may be achieved. As a representative example, and not by way of limitation, the probe length may be 28 inches, C3 may be between 50–100 pF, C4 between 5–50 pF, R2 and R3 between 50K–100K and P1 nominally 200K.

In order to achieve temperature stability of the circuit, resistances R1, P1 and R3 as well as capacitors C3 and C4 should be selected to have low temperature coefficients on the order of 100 PPM.

Figure 5:
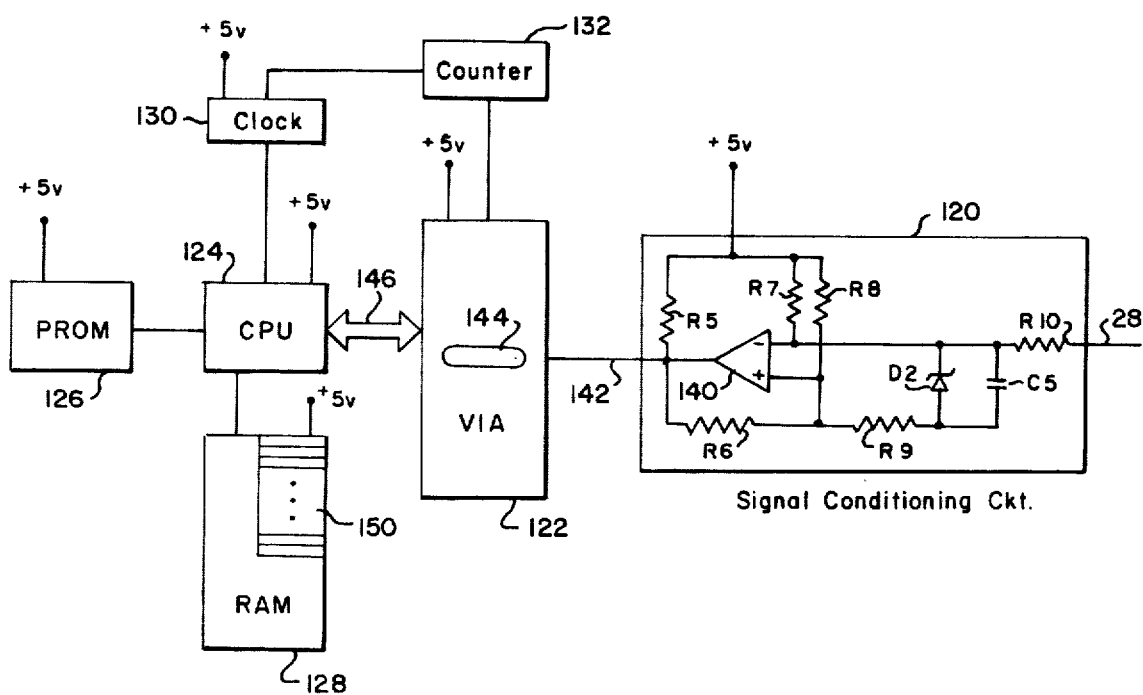
FIG. 5 is a schematic diagram of the processing means in accordance with the teachings of the invention.

FIG. 5 illustrates an overall block diagram of the processing means 14 of FIG. 1. The processing means 14 is seen to comprise a signal conditioning circuit 120, versatile interface adaptor (VIA) 122, central processing unit (CPU) 124, programmable read only memory (PROM) 126, random access memory (RAM) 128, clock means 130 and counter 132.

Signal conditioning means 120 is seen to comprise a comparator 140 having its inverting input terminal connected to receive the input signal along line 28. Comparator 140 is interconnected to resistors R5-R10, diode D2 and capacitor C5. Signal conditioning circuit 120 functions as a noise immune inverter and provides output signals having the same period as the input signals along line 28. The output signals are provided along line 142 to the VIA 122. VIA 122 comprises a register 144 which serves to store the number of counts fed in from the input line 144 during a period of time controlled by the clock means 130 and counter 132. The period (and consequently the frequency) of the signals along line 142 are the same as those along line 128 and consequently correspond to the capacitance of the probe 10. The central processing unit 124 is interconnected to the VIA 122 by means of data and register select lines indicated generally at 146. The CPU 124 operates in accordance with a program stored in PROM 126 and data resulting from the processing within the CPU 124 is stored in RAM storage memory 128. A segment 150 of the RAM 128 is shown reserved for storage of processed data signals proportional to sequential readings of the output (number of counts) in register 144 to provide a history of past measurements.

A particular advantage of the fuel meter system is in measurements of fuel flow rates. Such measurements are made possible by a relatively rapid sampling of the fluid level, i.e. sampling over short periods of time. Fuel level variations over these periods of time are indicative of fuel flow rates. Typically, the CPU 124 may be utilized to actuate register 144 for storing counts during a 10 ms time interval and the output of register 144 will be provided to the CPU and stored in RAM storage during a data readout cycle which occurs every 1.2 seconds as determined by clock means 130 and counter 132. The CPU 124 may be programmed to examine the input port fed by line 142 at a sampling rate of 0.8 $\mu$s over the 10 ms count interval to determine the number of high/low transitions and thus the number of pulses received within the given count interval. The number of pulses received is proportional to the frequency of the received signal pulses and inversely proportional to the pulse period. The pulse period is proportional to fluid level (and probe capacitance).

Segment 150 may contain, for example, fifteen registers for storing processed data signals corresponding to the previous fifteen readings of register 144. Reading the register 144 every 1.2 seconds then provides an 18 second past history of data for storage in segment 150 of RAM storage 128. The programs stored in PROM 126 may then be utlized to operate the CPU 124 for taking the average value of the fifteen registers of segment 150 for providing an average output signal to display 30 and/or data link 32 (FIG. 1). Alternately, the most recent reading from the register 144 may be utilized as the output signal. Still further, an output signal which occurred 18 seconds ago may be utilized as a display signal. This delayed measurement signal is particularly appropriate, for example, where the vehicle first starts into motion and causes the fuel to splash around in tank 4 providing a generally unstable reading for fuel levels measurements. In such cases the CPU may be programmed to take the prestart value of the fuel level for display or future transfer to the data link. Further, the CPU may be programmed to await additional time after the vehicle is started or stopped prior to measuring any further fuel data. For example, a delay of 15–30 seconds has been found advantageous to permit fuel levels to become quiescent.

The fifteen memory locations may be utilized to store the current 18 seconds of fuel level or flow rate data. New data is stored at the bottom of the stack and shifts previously stored data up one memory location. The oldest data is shifted out.

It is thus possible in utilizing the processing means 14 in combination with interface 12 and probe 10 to achieve not only fluid level measurements but fluid rate measurements to nearly any desired degree of granularity. Moreover, the described fuel meter system is completely non-intrusive and does not interfere in any way with the normal flow rates which are desired to be measured. The fuel meter system thus has a distinct advantage over numerous other systems which require an actual diversion of the normal flow channels in order to measure flow rates.

By way of example, the CPU 124 may comprise, for example, a Model 6504 microprocessor and the VIA 122 may be Model 6522, both manufactured by Rockwell International. PROM storage 126, for example, may comprise Model 2716 and RAM storage 128 may comprise Model 4104, both manufactured by Mostek.

The operation of the electronic fuel meter system is based upon the relationship of capacitance with the length of the probe submerged in the fuel. Generally, the capacitance between two electrodes is given by $C = \epsilon A/g$, where C is the capacitance, $\epsilon$ is the permittivity, A is the surface area of the electrode and g is the gap between the electrodes. In the preferred embodiment, the electrodes are cylindrical and concentrically arranged as shown in FIG. 2. Under these conditions the area is proportional to the length of the electrode and consequently the capacitance is proportional to the length of the probe. The capacitance changes in response to the dielectric constant of the material between the two electrodes, and consequently, the capacitance of the probe at any given time is linearly proportional to the height of the fuel within the tank. Interface 12 provides a mechanism for converting the capacitance value to the period of pulses generated by the timing circuit 100. For example, an empty probe will have a capacitance such as to cause the timing circuit to generate pulses having periods of 60 $\mu$s. When the probe is fully submersed in the fuel indicative of a full fuel tank, the capacitance is such as to produce output signals of a period of 110 $\mu$s. Knowing the volume of the fuel tank, the two end points may be utilized to linearly relate any period of the signals from the timing circuit 100 to the level of the fuel in the tank (and consequently the volume remaining). Assuming, for example, a 120 gallon tank, a change in the period from 90 μs to 70 μs will produce a 20/50 or 40% decrease in the level of the fuel in the tank which corresponds to a 40% decrease of the tank volume, i.e. 48 gallons consumed. Of course, the relationship of the fuel level to fuel volume depends on the geometry of the tank and a linear relationship is strictly true for rectangular tanks. The great majority of fuel tanks, particularly those utilized in trucks, are cylindrical, and thus the relationship between fuel height and fuel volume is not exactly linear. However, it has been found that for fuel levels varying between 20% and 80% of the fuel volume in cylindrical tanks the relationship is linear within an error factor of 0.8%.

Figure 6:
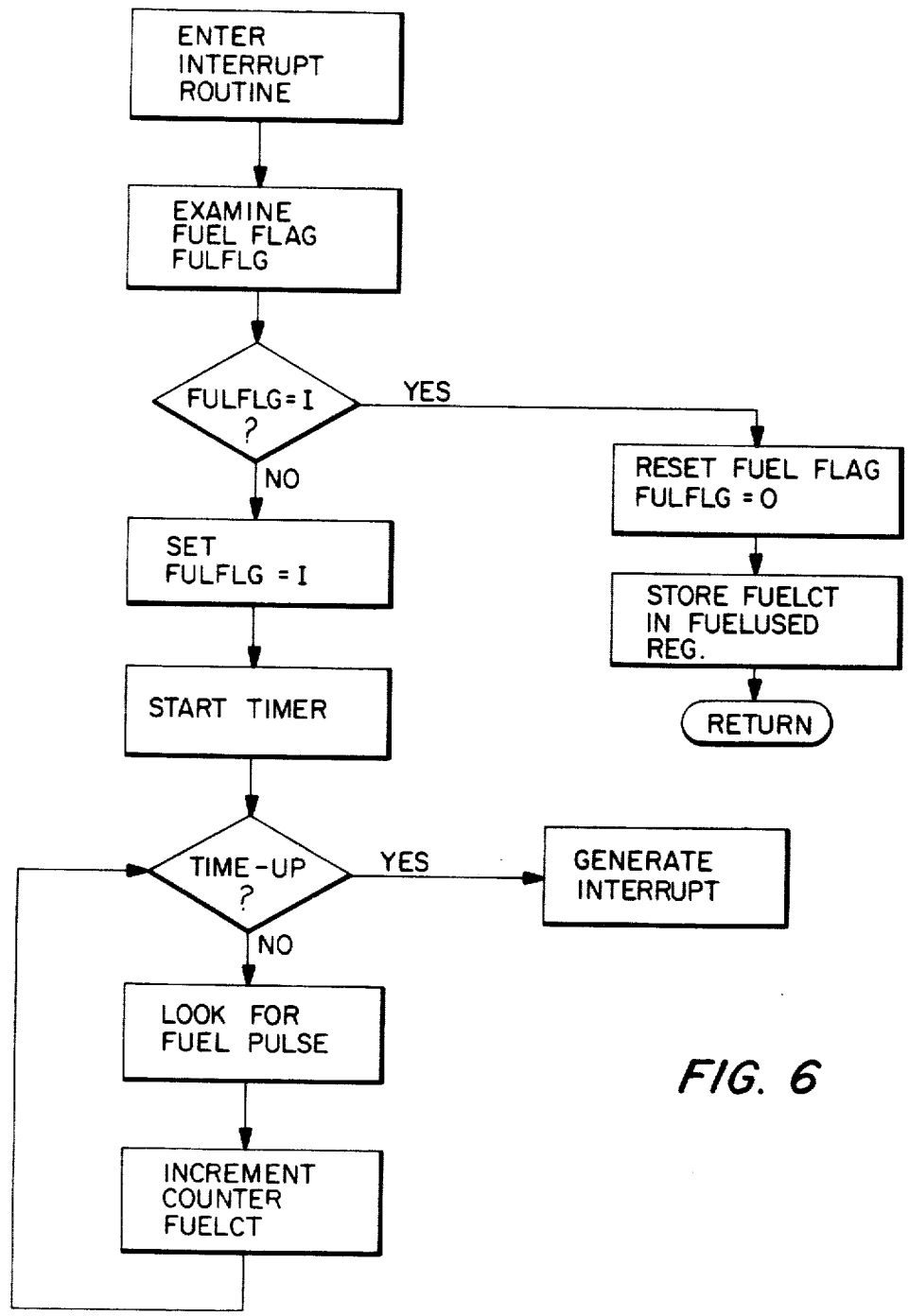
FIG. 6 is a flowchart illustration of the operation of the computer program set forth in the appendix.

A simple assembly language program operable to calculate consumed fuel as outlined above is set forth, by way of example, in the Appendix. A flowchart illustrating the overall operation of the program is shown in FIG. 6. The program is typically incorporated within an interrupt routine of a main program. The interrupt routine is entered only when an interrupt flag is generated typically from one of several sources. The fuel flag, FULFLG, is examined to see if it was the cause of the interrupt, and if not the fuel flag is set (FULFLG=1), and the time loaded with a preset value for the time window, e.g. 10 ms. The program then loops in a counting routine counting the received fuel pulses and storing them in FUELCT until the timer times out. On time-out an interrupt is generated which causes the interrupt routine to be entered with FULFLG=1. The fuel flag is reset and the contents of the FUELCT are loaded and stored into location FUELUSED. The interrupt routine then returns to the main program (not shown).

A particular advantage has been found in utilizing a capacitive probe in accordance with the principles of the invention. In particular, there is no requirement to utilize any temperature compensation in the fuel meter system. An increase in temperature produces a corresponding increase in the volume of the fuel and a corresponding decrease in the fuel density. However, a decrease in the fuel density also produces a decrease in the dielectric constant of the fuel which directly offsets the density change. The net effect is therefore that the capacitance value does not change significantly as a function of temperature. The temperature coefficient of the dielectric constant for diesel fuel is 0.032% per degree Fahrenheit whereas the temperature coefficient of density for diesel fuel is 0.033% per degree Fahrenheit. Substantial temperature independence has been noted for diesel fuel, for example, for temperature ranges between −10° F. and 190° F. Inasmuch as the dielectric constant of a material is proportional to the density of the material, one would expect that the substantial independence of the capacitance value with temperature would hold not only for diesel fuel but for gasoline and other petroleum fluids as well.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

```
                STA  STA    ; STATUS
                PHA         RESTORE ON STACK
                LDA  ACCSAV
                PHA         SAVE ACCUM
                TXA         SAVE X REG
                PHA
                TYA         SAVE Y REG
                PHA
                LDA  #$10
                BIT  STATUS  ISOLATE SOFTWARE BREAK
                BEQ  NOBRKP
                INC  INTER
                JMP  START
        NOBRKP  LDA  IRQRES  RESET 1 SE IRQ BIT1
                BIT  IFR     CHECK IRQ BIT6 TIMER1
                BVC  GO      TAKE BR IF NOT TIME OUT
                JMP  IRQ1
        GO      SEI
                LDA  #$2B
                STA  VORB    RESET
                LDA  #$80
                STA  ONESEC  SET ONE SEC FLAG
                LDA  #$0B
                STA  VORB    RESET
                LDA  #$49
                STA  RPMTML
                LDA  #$61
                STA  RPMTMH  TIME DELAY TO MAKE INTERRUPT 1.2 SE
```

```
            JSR  TFRTES
            LDA  #$2F
            STA  VORB RESET
            LDA  SPDIRL READ SPD INPUT CNTS
            EOR  #$FF COMPLIMENT DATA
            STA  ODMETL
            LDA  SPDIRH
            EOR  #$FF COMPLIMENT DATA
            STA  ODMETH
            LDA  #$0B
            STA  VORB RESET
            LDA  #$FF
            STA  SPDIRL START TIMER2 COUNT DOWN
            STA  SPDIRH
            LDX  #$00
SPD1        INX  INC LOOP COUNTER
            LDA  #$4B
            STA  RPMTML
            LDA  #$20
            STA  RPMTMH
            JSR  TFRTES
            CPX  #13
            BNE  SPD1 LOOP THIRTEEN TIMES
            LDA  SPDIRL
            EOR  #$FF
            STA  SPDCTS
            LDA  RPMTM
            JSR       DATLNK
            LDA  #$08
            STA  VORB
            JSR  ODMLOG
            CLI
;THIS RPM ROUTINE IS BASED ON THE NUMBER OF TEETH
;ON THE FLYWHEEL
RPMSUB  LDA  #$00
        STA  RPMCTR
        LDA  RPMLTM CTS=>MSEC COUNT TIME FOR RPM
        STA  RPMTML STORE RPM COUNT TIME LO
        LDA  RPMHTM
        STA  RPMTMH STORE RPM COUNT TIME HI
RPM1    LDA  VORB READ RPM INPUT PULSE
        BPL  RPM1 TAKE BR IF NO PULSE PRESENT
        INC  RPMCTR
RPM2    LDA  VORB READ RPM INPUT PULSE
        BMI  RPM2 TAKE BR IF PULSE IS STILL HIGH
        JMP  RPM1
IRQ1    PLA
        PLA
        PLA
        PLA
        PLA
        PLA
        LDA  RPMCTR
        CMP  RPMPK CHECK FOR NEW PEAK RPM
        BCC  RPM3 TAKE IF RPM < PEAK
```

```
            STA  RPMPK STORE NEW PEAK
    RPM3    LDA  SPDCTS
            CMP  SPDPK COMPARE TO LAST SAVED PEAK
            BCC  RPM6  TAKE BR IF LESS THAN PEAK
            STA  SPDPK OTHERWISE STORE PEAK
    RPM6    JSR  TIMEUP
            LDA  RPMTML RESET TIMER INTERRUPT FLAG
            CLI
            LDA  #$00
            STA  FUELCT
            INC  FULFLG SET FLAG
            LDA  #$10
            STA  RPMTML
            LDA  #$27
            STA  RPMTMH
    FUL1    LDA  #$80
            BIT  VORF
            BNE  FUL1 BR IF NO PULSE
            INC  FUELCT
    FUL2    LDA  #$80
            BIT  VORF
            BEQ  FUL2
            JMP  FUL1

FUEL    PLA
            PLA
            PLA
            DEC  FULFLG
            LDX  #$01
    FUELRT  LDA  FUELUS,X
            DEX
            STA  FUELUS,X
            INX
            INX
            CPX  #$0F
            BCC  FUELRT
            LDA  FUELCT
            STA  FUELUS+14
    RPM7    LDA  RPMTML RESET IRQ FLAG BIT6
            PLA  RESTORE Y REG
            TAY
            PLA  RESTORE X REG
            TAX
            PLA  RESTORE ACCUMULATOR
            RTI
            *=$FFFA
            .BYT $00,$FB,$00,$FB,$ED,$FE
            .END TRIP29 / 2
```

What is claimed is:

1. A fluid meter system with a fluid tank for use in fluid measurements such as consumed fluid, remained fluid, or flow rate comprising:
   (a) a capacitive probe including first and second electrodes, means for securing said electrodes in a spaced-apart relationship and means for securing said electrodes in said fluid tank,
   (b) circuit means electrically connected to said first and second electrodes for providing signal pulses representative of the capacitance of said probe,
   (c) microprocessor means for receiving and processing said signal pulses including:
      (i) program memory storage means,
      (ii) data memory storage means,
      (iii) a central processing unit operable in accordance with a program of said program memory storage means for calculating from said received signal pulses data signals corresponding to said fluid measurements, and (iv) means for storing said fluid measurements in said data storage means, and (d) means for outputting said stored data signals for providing an indication of same.

2. A fluid meter system as recited in claim 1 wherein said signal pulses are representative of fluid level within said tank, said microprocessor means including means for sampling said signal pulses at relatively short time intervals, said central processing unit calculating flow rates as said fluid measurement.

3. A fluid meter system as recited in claim 2, 3 or 4 wherein said sampling time intervals are on the order of 1 second.

4. A fluid meter system as recited in claim 3 wherein said signal pulses are sampled during a relatively short counting period of time within said time intervals, said counting period on the order of 10 ms.

5. A fluid meter system as recited in claim 4 wherein said sampling rate of said sampling means is on the order of 0.8 s.

6. A fluid meter system as recited in claim 1 wherein said signal pulses are representative of fluid level within said tank, said microprocessor means including means for sampling said signal pulses at relative short time intervals, said central processing unit calculating fluid consumed as said fluid measurement.

7. A fluid meter system as recited in claim 1 wherein said signal pulses are representative of fluid level within said tank, said microprocessor means including means for sampling said signal pulses at relatively short time intervals, said central processing unit calculating fluid remaining as said fluid measurement.

8. A fluid meter system as recited in claim 1 wherein said circuit means provides signal pulses having a period proportional to the capacitance of said probe.

9. A fluid meter system as recited in claim 1 wherein said probe further includes a reference electrode positioned proximate a lower extremity of said first and second electrodes for substantially complete submersion in fluid of said fluid tank and wherein said circuit means comprises additional circuit means electrically connected to said reference electrode for providing additional signal pulses representative of the capacitance of said reference electrode said microprocessor means receiving and processing said signal pulses and said additional signal pulses.

10. A fluid meter system as recited in claim 9 wherein said data memory storage means stores reference signals corresponding to said reference electrode being submersed in difficult fluids, and wherein said microprocessor means is operable for processing said additional signal pulses for indicating a characteristic of the fluid in which said reference electrode is submersed.

11. A fluid meter system as recited in claim 1 wherein said fluid is a petroleum fuel and said signal pulses correspond to the amount of fuel substantially independent of temperature variations, said fuel having a temperature coefficient of volume substantially equal and opposite to the temperature coefficient of the dielectric constant of said fuel, whereby substantial temperature independence is achieved without specific temperature compensating apparatus.

12. A non-intrusive fuel measuring device for use with a fuel tank of a vehicle comprising:

(a) a capacitive probe including:

(i) first and second concentrically mounted electrodes, (ii) means for securing said first and second electrodes in spaced-apart relationship, (iii) mounting means for securing said probe to said tank and for positioning said first and second electrodes in the interior of said tank for immersion in said fuel, (b) digital interface circuit means secured and electrically connected to said probe for generating digital signals representative of the capacitive value between said first and second electrodes, (c) data processing means positioned remote from said tank and near an operator compartment of said vehicle for receiving said digital signals, said data processing means including:

(i) program memory storage means, (ii) data memory storage means, (iii) computing means connected to said program memory storage means and said data memory storage means for calculating from said digital signals the amount of fuel in said tank, and (iv) said data memory storage means storing data signals corresponding to the amount of fuel, and (d) means for outputting said data signals whereby the amount of fuel may be indicated.

13. A non-intrusive fuel measuring device as recited in claim 12 wherein said computing means calculates from said digital signals the amount of fuel consumed between first and second events.

14. A non-intrusive fuel measuring device as recited in claim 13 wherein said first and second events correspond to first and second points in time whereby fuel consumed, fuel remaining and fuel flow rate may be indicated.

15. A non-intrusive fuel measuring device as recited in claim 14 wherein said first and second events correspond to the start and end of a vehicle trip.

16. A non-intrusive fuel measuring device as recited in claim 12 wherein said first and second electrodes are cylindrical.

17. A non-intrusive fuel measuring device as recited in claim 12 or 16 wherein said first and second electrodes are anodized.

18. A non-intrusive fuel measuring device as recited in claim 12 wherein said data storage means comprises a random access memory for storing a plurality of data signals.

19. A non-intrusive fuel measuring device as recited in claim 18 wherein said data processing means is operable for storing in said random access memory more recently calculated data signals for continually replacing earlier calculated data signals of said plurality of data signals.

20. A non-intrusive fuel measuring device as recited in claim 19 wherein said data processing means is operable for calculating an average value of said plurality of data signals and for storing said average value in said random access memory as additional data signals.

21. A non-intrusive fuel measuring device as recited in claim 12 wherein said digital interface means generates digital signals having a period proportional to the capacitance of said probe.

22. A non-intrusive fuel measuring device as recited in claim 21 wherein said interface means and said capacitance probe form an astable multivibrator, the charging and discharging time of said capacitive probe determining the period of oscillation of said astable multivibrator and digital signals.

23. A non-intrusive fuel measuring device as recited in claim 12 wherein said probe further includes a reference electrode positioned proximate a lower extremity of said first and second electrodes for substantially complete submersion in fuel of said tank and wherein said circuit means comprises additional circuit means electrically connected to said reference electrode for providing additional signals representative of the capacitance of said reference electrode said data processing means receiving and processing said digital signals and said additional signals.

24. A non-intrusive fuel measuring device as recited in claim 23 wherein said data memory storage means stores reference signals corresponding to said reference electrode being submersed in different fluids, and wherein said data processing means is operable for processing said additional signals for indicating a characteristic of the fluid in which said reference electrodes is submersed.

25. A non-intrusive fuel measuring device as recited in claim 12 wherein said digital signals correspond to the amount of fuel substantially independent of temperature variations, said fuel having a temperature coefficient of volume substantially equal and opposite to the temperature coefficient of the dielectric constant of said fuel, whereby substantially temperature independence is achieved without specific temperature compensating apparatus.

26. A fuel measuring device for use with a fuel tank of a recirculating fuel diesel engine vehicle, said fuel tank having a fuel gauge port, said device comprising:
  (a) a capacitive probe having first and second electrodes spaced-apart for receiving fuel therebetween,
  (b) means for mounting said probe to said fuel gauge port for immersion of said electrodes in fuel of said fuel tank,
  (c) circuit means electrically connected to said electrodes for providing signal pulses representative of the capacitive value of said probe,
  (d) means for securing said circuit means to a portion of said mounting means and exterior to said tank,
  (e) processing means connected to receive said signal pulses and operable under program control to store data signals indicative of the amount of fuel in said tank, and
  (f) means for providing an output of said stored data signals whereby the amount of fuel may be indicated.

27. A fuel measuring device as recited in claim 26 wherein said first and second electrodes form outer and inner concentrically mounted cylindrical electrodes.

28. A fuel measuring device as recited in claim 27 wherein said mounting means comprises a flange secured to said outer electrode and insulator means positioned between said inner and outer electrodes and proximate ends thereof.

29. A fuel measuring device as recited in claim 28 wherein said circuit means is mounted on a printed circuit board and said securing means comprises screw means extending through said printed circuit board to said flange.

30. A fuel measuring device as recited in claim 27 wherein said outer electrode is grounded to said tank and extends beyond said inner electrode and a bottom portion thereof, said device further comprising a reference capacitor having a reference electrode positioned below and electrically insulated from said inner electrode and havig said outer electrode as a ground electrode.

31. A fuel measuring device as recited in claim 26 further comprising a reference probe positioned at a lower end of said capacitive probe.

32. A fuel measuring device as recited in claim 26 wherein signal pulses correspond to the amount of fuel in said tank substantially independent of temperature variations, said fuel having a temperature coefficient of volume substantially equal and opposite to the temperature coefficient of the dielectric constant of said fuel, whereby substantial temperature independence is achieved without specific temperature compensating apparatus.

33. A fuel flow rate measuring device for use with a fuel tank of a recirculating fuel diesel engine vehicle, said fuel tank having a fuel gauge port, said device comprising:
  (a) a capacitive probe having first and second electrodes spaced-apart for receiving fuel therebetween,
  (b) means for mounting said probe to said fuel gauge port for immersion of said electrodes in fuel of said fuel tank,
  (c) circuit means electrically connected to said electrodes for providing signal pulses representative of the capacitive value of said probe,
  (d) means for securing said circuit means to a portion of said mounting means and exterior to said tank,
  (e) processing means connected to receive said signal pulses and operable under program control to store data signals indicative of the net fuel flow rate from said tank, and
  (f) means for providing an output of said stored data signals whereby the fuel flow rate may be indicated.

34. A non-intrusive capacitive-type fuel measuring device for use with a diesel fuel tank of a diesel engine vehicle, said diesel fuel having a temperature coefficient of volume expansion substantially equal and opposite to its temperature coefficient of dielectric constant thereby enabling substantial temperature independent capacitive measurements by said device, said device comprising:
  (a) a capacitive probe including:
    (i) first and second concentrically mounted electrodes,
    (ii) means for securing said first and second electrodes in spaced-apart relationship,
    (iii) mounting means for securing said probe to said tank and for positioning said first and second electrodes in the interior of said tank for immersion in said fuel,
  (b) digital interface circuit means secured and electrically connected to said probe for generating digital signals representative of the capacitive value of said first and second electrodes,
  (c) data processing means positioned remote from said tank and near an operator compartment of said vehicle for receiving said digital signals, said data processing means including:
    (i) program memory storage means,
    (ii) data memory storage means,
    (iii) computing means connected to said program memory storage means and said data memory storage means for calculating from said digital signals the amount of fuel in said tank, and
    (iv) said data memory storage means storing data signals corresponding to the amount of fuel, and
  (d) means for outputting said data signals whereby the amount of fuel may be indicated.

* * * * *